United States Patent
Yuen et al.

(10) Patent No.: US 6,687,906 B1
(45) Date of Patent: Feb. 3, 2004

(54) EPG WITH ADVERTISING INSERTS

(75) Inventors: Henry C. Yuen, Pasadena, CA (US); Roy J. Mankovitz, Calabasas, CA (US); Daniel S. Kwoh, La Canada/Flintridge, CA (US); Elsie Y. Leung, South Pasadena, CA (US)

(73) Assignee: Index Systems, Inc., Tortola (VG)

( * ) Notice: Subject to any disclaimer, the term of this patent is extended or adjusted under 35 U.S.C. 154(b) by 0 days.

(21) Appl. No.: 09/284,894

(22) PCT Filed: Dec. 19, 1997

(86) PCT No.: PCT/US97/23852
§ 371 (c)(1),
(2), (4) Date: Jul. 13, 1999

(87) PCT Pub. No.: WO98/27723
PCT Pub. Date: Jun. 25, 1998

Related U.S. Application Data
(60) Provisional application No. 60/034,784, filed on Dec. 19, 1996.

(51) Int. Cl.[7] .............................. G06F 3/00; G06F 13/00; H04N 5/445
(52) U.S. Cl. .............................. 725/42; 725/32; 705/14
(58) Field of Search .............................. 725/42, 43, 46, 725/40, 34, 32, 33, 35, 36, 44; 705/14; H04N 7/025, 7/10; G06F 3/00, 13/00

(56) References Cited

U.S. PATENT DOCUMENTS

| | | | |
|---|---|---|---|
| 5,541,738 A | 7/1996 | Mankovitz | 358/335 |
| 5,589,892 A | 12/1996 | Knee et al. | 348/731 |
| 5,594,509 A * | 1/1997 | Florin et al. | 348/731 |
| 5,848,352 A * | 12/1998 | Dougherty et al. | 725/110 |
| 5,940,073 A * | 8/1999 | Klosterman et al. | 345/773 |
| 6,005,562 A * | 12/1999 | Shiga et al. | 345/721 |
| 6,078,348 A * | 6/2000 | Klosterman et al. | 725/40 |
| 6,177,931 B1 * | 1/2001 | Alexander et al. | 345/721 |

FOREIGN PATENT DOCUMENTS

| | | |
|---|---|---|
| WO | WO 95/01056 | 1/1995 |

OTHER PUBLICATIONS

"International Search Report," International Application No. PCT/US97/23852, Jun. 1, 1998, 2 pages.

* cited by examiner

*Primary Examiner*—Vivek Srivastava
(74) *Attorney, Agent, or Firm*—Christie, Parker & Hale, LLP

(57) ABSTRACT

In one embodiment, the invention is a system and method for simultaneously displaying advertisements with an electronic program guide (EPG). The system displays television schedule information in rows of schedule information items including the time and channel for at least a portion of the displayed television schedule information items. An advertisement is selected for display from a plurality of advertisements, and the selected advertisement is displayed between two rows of the schedule information items simultaneously with the displayed television schedule information items.

10 Claims, 2 Drawing Sheets

EPG WITH ADVERTISING INSERTS

This appication claims the benefit of Provisional Application Ser. No. 60/034,784 filed Dec. 19, 1996.

BACKGROUND

This invention relates to electronic program guides that incorporate advertising messages or words.

As the number of television channels available on cable and by satellite expands, an onscreen electronic program guide (EPG) become more indispensable. Such an EPG permits the user to sort the available present and future programming by theme, time, and channel. As a result, the user can find a program of interest more easily.

It is costly to collect EPG data for display and to transmit such data to the consumer. Thus, there is a need to find a way to recover the cost of these activities.

SUMMARY

According to the invention, advertisements are inserted in an EPG on the screen of a display monitor between the individual television program listings. Specifically, a memory stores EPG data and advertising data. A microprocessor is programmed to recover EPG data corresponding to a number of television programs and advertising data from the memory. The microprocessor controls the monitor to display the recovered EPG data on the screen in lines of television program listings, each television program listing being displayed in a separate line, and to display the recovered advertising data in a line on the screen instead of one of the television program listings.

In a preferred embodiment, the EPG and advertising data are displayed in a first area of the screen and a detail window is displayed in a second area of the screen. One of the lines of EPG data is highlighted with a cursor. A description of the television program listing highlighted by the cursor is inserted in the second area. When the line of advertising data is highlighted with the cursor, a description relating to the advertising data is inserted in the second area.

DETAILED DESCRIPTION OF THE DRAWINGS

Figure 1:
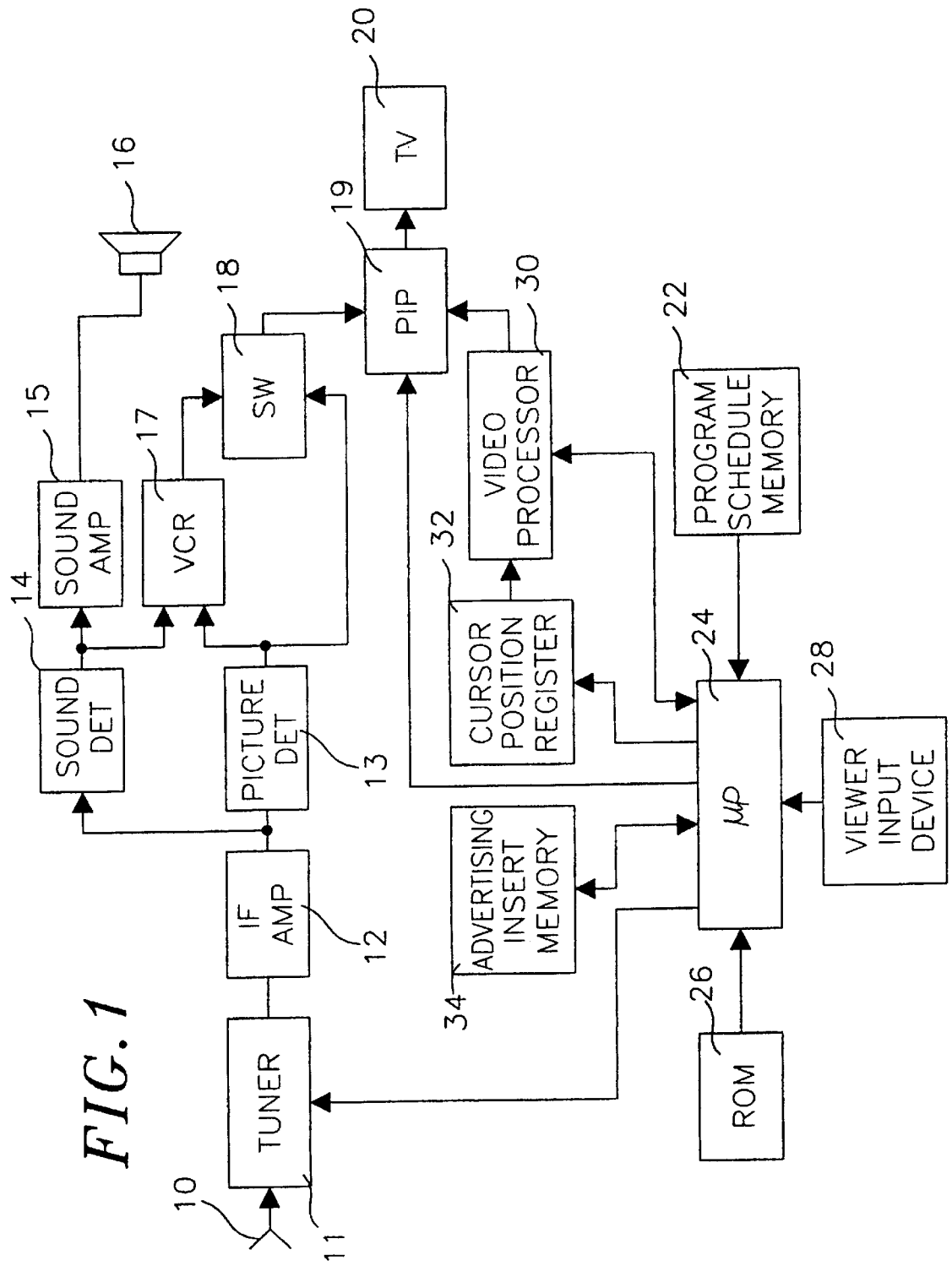
FIG. 1 is a schematic block diagram of apparatus for carrying out the invention.

The disclosures of U.S. application Ser. No. 08/475,395, filed on Jun. 7, 1995, issued as U.S. Pat. No. 6,239,794, May 29, 2001, and application Ser. No. 08/728,614, filed on Oct. 10, 1996, issued as U.S. Pat. No. 6,028,599, Feb. 22, 2000, are incorporated fully herein by reference. As illustrated in the former application, a source of television signals 10 in FIG. 1 such as terrestrial antenna, or a cable is connected to a television tuner 11. The output of tuner 11 is a modulated intermediate frequency signal containing video and audio television information. Tuner 11 is connected by an intermediate frequency amplifier (IF AMP) 12 to a picture detector (PICTURE DET) 13 and a sound detector (SOUND DET) 14, which produce base band video an audio signals, repectively. The audio signal is coupled by a sound amplifier (SOUND AMP) 15 to a loudspeaker 16. The video signal is coupled by a video amplifier not shown to one input of a switch 18. Sound detector 14 and picture detector 13 are connected to the audio video inputs, respectively, of a video cassette recorder (VCR) 17. (Alternatively, television signal source 10 could be directly connected to the RF input of VCR 17, if its internal turner and demodulating circuitry is to be utilized.) The output of VCR 17 is connected to the outer input of switch 18. The output of switch 18 is connected to one input of a conventional picture-in-picture (PIP) integrated circuit chip 19. The output of PIP chip 19 is connected to the video input of a television receiver or monitor (TV) 20 having a screen (not shwon).

An updatable data base of the schedule of program listings of all the available channels for a prescribed period of time, e.g a day or a week, is electronically stored in a program schedule memory 22. These program listings typically include for each program the title, a program description, the day of the week, the start time of the day, the program length, and the channel on which the program is transmitted and thus available for reception at source 10. In a preferred embodiment of the invention, the period of time for which the program listings are stored is different for the guides, depending upon viewer priorities and preferences. For example, the information needed to display the time specific program guide (TISPG) and channel specific program guide (CSPG) may be stored for one or two days and the information needed to display the theme specific program guide (THSPG) may be stored for a week or more. The data base can be updated by a continuous data link in the vertical blanking interval (VBI) of one television channel broadcast to the television receiver in well known fashion. Alternatively, the data base can be updated by unplugging memory 22 and replacing it with a memory having the updated data base. Memory 22 is connected to a microprocessor 24 that is programmed to control the operation of the described equipment. An operating program for microprocessor 24 is stored in a read only memory (ROM) 26. A lies ei input device 28, preferably in the form of a remote IR controller, is coupled to microprocessor 24 to provide commands from the viewer. A video processor 30 is coupled to microprocessor 24. When the viewer wishes to see television program listings, microprocessor 24 recalls a portion of the program schedule data base from memory 22 and couples it to video processor 30, where the program listings are formatted for display. Preferably, the information stored in video processor 30 is a bit map of what is displayed on the screen of television receiver 20. Video processor 30 is connected to the other input of PIP chip 19. Preferably, viewer input device 28 controls microprocessor 24 by cursor movement on the screen of television receiver 20. To this end, microprocessor 24 and video processor 30 are coupled to a cursor position register 32. (Alternatively, the viewer can select items of information displayed on the screen by keying into viewer input device 28 code numbers assigned to these items.) Microprocessor 24 is also coupled to tuner 11 for channel change, to VCR 17 for play/record selection and start/stop, to switch 18 for selection for one of its inputs, and to PIP chip 19 for selection of the mode of PIP operation.

Figure 2:
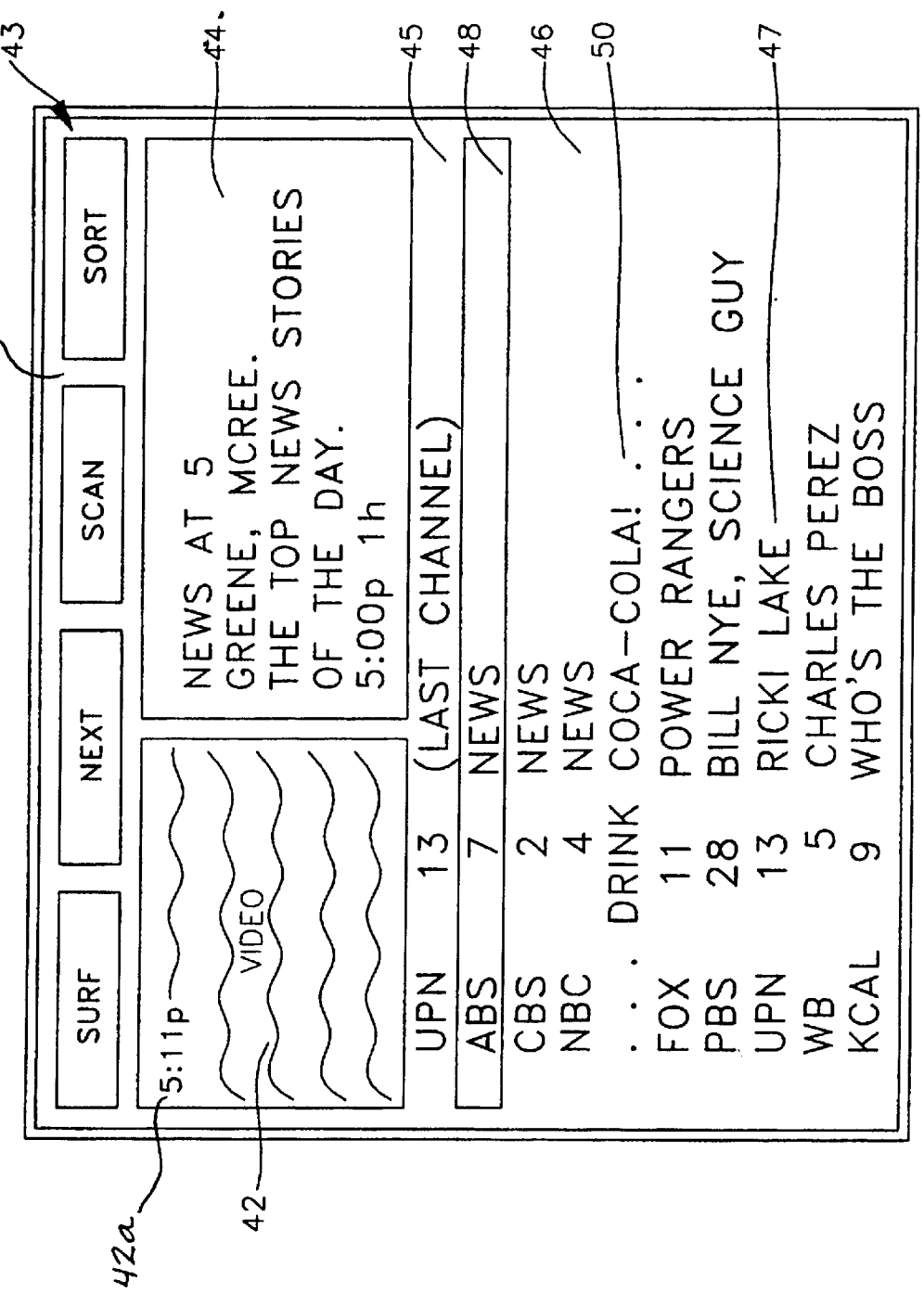
FIG. 2 is a screen format produced by the apparatus of FIG. 1.

The format of the electronic program guide is shown in FIGS. 2. The format has a background area 40 and an overlaid PIP window 42 in the upper left-hand corner of the screen. The real time, i.e., 5:11 p.m., is displayed in a sub-area 42a of PIP window 42. Background area 40 includes a banner and message prompting area 43 at the top of the screen, a program description area 44 in the upper right-hand corner of the screen adjacent to PIP window 42, and a program schedule area 46 below areas 42 and 44. Program description area 44 includes the start time and length (duration) of the program being described. In area 46, EPG data retrieved from memory 22 is displayed in lines, each program listing being displayed in a separate line. The viewer can move a cursor 48 vertically to highlight one of the lines of program listings displayed in area 46. The highlighted background of cursor 48 and the background of program description area 44 are preferably the same color or shade. The complete, moving images of a currently broadcast television program in real time and the current time are displayed in PIP window 42 and the audio portion of the television program displayed in PIP window 42 is reproduced by the sound system of monitor 20.

Advertising inserts are displayed on the screen between the lines of program listings in program schedule area 46 and related information or announcements are displayed in description area 44. With reference to FIG. 1, the advertising inserts are preferably transmitted in the VBI as part of the program schedule information and stored at the television receiver in RAM, represented functional as an advertising insert memory 34. Preferably the inserts are transmitted as part of the packets of information about the programs, i.e. show information packages (SIPs), with which the advertising inserts are displayed. The apparatus of FIG. 1 functions as described in 08/475,395, the advertising inserts being treated as part of the program listings displayed in area 46 and the brief program descriptions displayed in area 44.

In practice, memory 34 and memory 22 could be physically incorporated in a single RAM.

Addresses for the advertising inserts could be stored as part of the preestablished time lists for the programs with which the advertising inserts are displayed. Thus, the addresses link the time lists to the advertising inserts, and each advertising insert is only stored once in memory 34. By linking the advertising inserts to the time lists, the displayed advertising insert becomes time dependent. Thus, the content of the displayed advertisements can, to some extent, be directed to the interests of the viewers. Advertisements of interest to housewives would be displayed in the morning and advertisements of interest to children would be displayed in the early evening.

As illustrated in FIG. 2, an advertising insert 50 is preferably displayed as a line below the listing, "NBC 4 NEWS" of the television program that the advertiser, e.g., Coca Cola, sponsors. However, it is not necessary that there be a relationship between the position of the advertiser and the television program, depending on the circumstances. To obtain more information about the subject of advertising insert 50, the viewer highlights the line with cursor 48; then such information is displayed in area 44, instead of information about a television program. For example, the announcement in area 44 could inform the viewer that the advertised product is on sale in articular retail establishment at a particular price or give an more detailed product description.

What is claimed is:

1. Apparatus for displaying advertisements comprising:
   a memory for storing electronic program guide data and advertising data;
   a display monitor having a screen;
   means for accessing the memory to recover electronic program guide data corresponding to a number of television programs;
   means for displaying the recovered electronic program guide data on the screen in lines of television program listings, each of the lines of television program listings being displayed in a separate line;
   means for accessing the memory to recover the advertising data; and
   means for inserting the recovered advertising data in a line on the screen between lines of the television program listings, wherein the advertising data contains information other than a channel name, channel number, and a program title.

2. The apparatus of claim 1, in which the electronic program guide data is displayed in a first area of the screen, the apparatus additionally comprising:
   means for highlighting one of the lines of electronic program guide data on the screen with a cursor;
   means for displaying a detail window in a second area of the screen simultaneously with the displayed electronic program guide data; and
   means for inserting a description of the television program listing highlighted by the cursor in the second area.

3. The apparatus of claim 2. additionally comprising:
   means for highlighting the line of the advertising data on the screen with a cursor; and means for inserting information relating to the advertising data highlighted by the cursor in the second area to be displayed simultaneously with the displayed electronic program guide data.

4. Apparatus for displaying advertisements comprising:
   a memory that stores electronic program guide data and advertising data;
   a display monitor having a screen;
   a microprocessor that accesses the memory to recover the electronic program guide data corresponding to a number of television programs and accesses the memory to recover the advertising data; and
   a video processor that displays the recovered electronic program guide data on the screen in lines of television program listings, each of the lines of television program listings being displayed in a separate line, the video processor configured to insert the recovered advertising data in a line on the screen between lines of the television program listings, wherein the advertising data contains information other than a channel name, channel number, and a program title.

5. The apparatus of claim 4, wherein the electronic program guide data is displayed in a first area of the screen, the apparatus additionally comprising:
   a viewer input device that highlights one of the lines of television program listings with a cursor, wherein the video processor is configured to display a detail window in a second area of the screen, and wherein the video processor is configured to insert a description corresponding to the highlighted one of the lines of television program listings in the second area of the screen to be displayed simultaneously with the displayed electronic program guide data.

6. The apparatus of claim 4, wherein the viewer input device is further configured to highlight the inserted line of advertising data with a cursor, and wherein the video processor is further configured to display information relating to the highlighted line of advertising data in the second area of the screen to be displayed simultaneously with the displayed electronic program guide data.

7. A method for displaying advertisements in an electronic program guide comprising:
   storing electronic program guide data and advertising data in a memory, the electronic program guide data corresponding to a plurality of television programs;
   retrieving the electronic program guide data from memory;

displaying the electronic program guide data in a display in lines of television program listings, each of the lines of television program listings being displayed in a separate line;

retrieving the advertising data from memory; and inserting the retrieved advertising data in a line on the screen between lines of the television program listings, wherein the advertising data contains information other than a channel name, channel number, and a program title.

8. The method of claim 7 further comprising:

highlighting one of the lines of television program listings with a cursor;

displaying a detail window in a second area of the screen; and displaying a description corresponding the highlighted one of the lines of television program listings in the second area of the screen simultaneously with the displayed electronic program guide data.

9. The method of claim 8 further comprising:

highlighting the inserted line of advertising data with a cursor; and displaying information relating to the highlighted line of advertising data in the second area of the screen simultaneously with the displayed electronic program guide data.

10. The method of claim 7 further comprising:

transmitting the advertising data and the electronic program guide data in the vertical blanking interval.

* * * * *

UNITED STATES PATENT AND TRADEMARK OFFICE
CERTIFICATE OF CORRECTION

PATENT NO. : 6,687,906 B1  
APPLICATION NO. : 09/284894  
DATED : February 3, 2004  
INVENTOR(S) : Henry C. Yuen et al.

Page 1 of 1

It is certified that error appears in the above-identified patent and that said Letters Patent is hereby corrected as shown below:

IN THE CLAIMS:

Column 6, claim 8, line 1: add -to- after "corresponding"

Signed and Sealed this  
Twenty-fourth Day of December, 2013

Margaret A. Focarino  
*Commissioner for Patents of the United States Patent and Trademark Office*